(12) United States Patent
Chang

(10) Patent No.: US 9,318,043 B2
(45) Date of Patent: Apr. 19, 2016

(54) SYSTEMS AND METHODS FOR COORDINATING PORTABLE DISPLAY DEVICES

(71) Applicant: Mobbers, Inc., Arcadia, CA (US)

(72) Inventor: Dennis Chang, Arcadia, CA (US)

(73) Assignee: Mobbers, Inc., Arcadia, CA (US)

( * ) Notice: Subject to any disclaimer, the term of this patent is extended or adjusted under 35 U.S.C. 154(b) by 87 days.

(21) Appl. No.: 13/937,519

(22) Filed: Jul. 9, 2013

(65) Prior Publication Data

US 2014/0009366 A1 Jan. 9, 2014

Related U.S. Application Data

(60) Provisional application No. 61/669,524, filed on Jul. 9, 2012.

(51) Int. Cl.
*G09G 5/00* (2006.01)
*G09G 3/20* (2006.01)
*G06F 3/14* (2006.01)

(52) U.S. Cl.
CPC ............ *G09G 3/2092* (2013.01); *G06F 3/1446* (2013.01); *G09G 2300/026* (2013.01); *G09G 2354/00* (2013.01)

(58) Field of Classification Search
CPC ........... G06F 3/1446; G09G 2300/026; G09G 2354/00; G09G 3/2092
USPC ................................. 345/156–184
See application file for complete search history.

(56) References Cited

U.S. PATENT DOCUMENTS

| 7,835,505 B2 | 11/2010 | Toyama et al. |
| 7,936,790 B2 | 5/2011 | Schmidt et al. |
| 2008/0106506 A1* | 5/2008 | Doser ..................... G09G 3/007 345/84 |
| 2010/0111410 A1* | 5/2010 | Lu et al. ........................ 382/166 |
| 2010/0328447 A1* | 12/2010 | Watson ......................... 348/135 |
| 2011/0310073 A1 | 12/2011 | Nagata |
| 2012/0092234 A1 | 4/2012 | Trooskin-Zoller et al. |
| 2012/0131465 A1* | 5/2012 | Telek et al. .................... 715/733 |

OTHER PUBLICATIONS

Husseini, S. N., "Intergraph Process, Power, & Marine", Intergraph, Norway, Nov. 12, 2008, http://www.intergraph.com/global/no/p2c2/documents/SP3D2009ProductUpdateNov-12-Sam.pdf.

(Continued)

*Primary Examiner* — Kumar Patel
*Assistant Examiner* — Insa Sadio
(74) *Attorney, Agent, or Firm* — Fish & Tsang LLP

(57) ABSTRACT

A system for distributing display content to multiple heterogeneous mobile display devices is presented. The system includes several independently operated mobile display devices and a host server. The host server is communicatively coupled with the independent mobile display devices and is configured to divide the display content into several pixels. The host server is also configured to assign single pixels from the several pixels individually to distinct display devices selected from the several mobile display devices. The host server is also configured to instruct the display devices having assigned pixels to display their assigned single pixels. In some embodiments, the host server is configured to assign the single pixels to the display devices according to the attributes of the display devices.

20 Claims, 7 Drawing Sheets

(56) References Cited

OTHER PUBLICATIONS

Popov, V. et al., "Plant Design Using SolidWorks Together with Solution Partner Products and Other Standard Industry Tools", Solid Works World 2010, http://www.solidace.com/downloads/SWW2010-presentation21026-VPopov.pdf.

* cited by examiner

SYSTEMS AND METHODS FOR COORDINATING PORTABLE DISPLAY DEVICES

This application claims the benefit of priority to U.S. provisional application having Ser. No. 61/669,524 filed on Jul. 9, 2012. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is synchronization of distributed content across multiple displays.

BACKGROUND

It is both exciting and entertaining to watch live shows (e.g., concerts, sport games, etc.) with hundreds or thousands of other people. Often times, to increase the excitement of the experience, audiences use creative ways to actively participate in the show. For example, some audiences bring candles or flash lights and wave the candles or flash lights along with the music during a concert. Other audiences create "waves" during a sport game in a packed stadium by having successive groups of audiences briefly stand and raise their arms, and immediately return to the usual seated positions.

With the advent of technology, different applications have been developed to assist audiences to participate in these live events. For example, applications have been developed for mobile devices with large display screen to display an image (e.g., a candle image) so that the audience can wave their mobile devices during a concert, instead of purchasing and bringing candles or flash lights into the concert. See http://itunes.apple.com/us/app/free-candle/id434064534?mt=8.

In addition, applications have been developed that allow the organizer of the events to control or coordinate the participation of the audiences. For example, http://xylobands.com/ discloses a wrist band that includes light-emitting diode (LED) lights and a radio receiver. The radio receiver of the wrist band can be configured to receive signals sent by a host device. Thus, the organizer of an event can pass these wrist bands to the audiences and coordinate the LED lights by sending different radio signals to the wrist bands. In a similar fashion, http://disneyparks.disney.go.com/blog/2012/06/disney-california-adventure-park-guests-will-glow-with-the-show-at-disney-california-adventure-park/ discloses a hat that includes LED lights in different colors and a radio receiver. The organizer here can coordinate the LED lights in the hats worn by audiences by sending radio signals, such that the hats of the audience can "glow" together in a particular pattern.

Other examples of coordinating the displays of multiple devices include:
- A presentation by Husseini titled "Intergraph Process, Power, & Marine" (http://www.intergraph.com/global/no/p2c2/documents/SP3D009 ProductUpdateNov-12-Sam.pdf), published Nov. 12, 2008; and
- A presentation by Popov et al. titled "Plant Design Using SolidWorks Together with Solution Partner Products and Other Standard Industry Tools (http://www.solidace.com/downloads/SWW2010-presentation21026-VPopov.pdf), published 2010.
- U.S. Pat. No. 7,936,790 issued to Schmidt et al., titled "Synchronizing Related Data Streams in Interconnection Networks", filed Aug. 30, 2007, discloses a method for synchronizing the display data for multiple devices across a network;
- U.S. patent publication 2010/0328447 to Watson, titled "Configuration of Display and Audio Parameters for Computer Graphics Rendering System Having Multiple Displays", filed Jun. 26, 2009, discloses coordinating a view across multiple display devices having arbitrary physical layout using a camera;
- U.S. patent publication 2012/0092234 to Trooskin-Zoller et al., titled "Reconfigurable Multiple-Plane Computer Display System", filed Oct. 13, 2010, discloses displays that are capable of sensing their locations and know which data to display based on the locations;
- U.S. Pat. No. 7,835,505 issued to Toyama et al., titled "Phone-to-Monitor Connection Device", filed May 13, 2005, discloses a device that connects a mobile phone to a TV so that content that is available on the phone can be displayed on the TV screen; and
- U.S. patent publication 2011/0310073 to Nagata, titled "Portable Terminal, Display Control Program, and Display Control Method", filed Aug. 30, 2011, discloses a terminal for coordinating the luminance level of multiple displays of a device based on a measured brightness level.

However, none of the systems effectively coordinate a large number of heterogeneous display devices in a stadium setting. Thus, there is still a need for an application that allows an event organizer to coordinate the display of content from a large number of audiences' personal display devices.

SUMMARY OF THE INVENTION

The inventive subject matter provides systems, apparatus, and methods for distributing content across multiple display devices. One aspect of the inventive subject matter includes a distributed content display system capable of presenting content. In some embodiments, the distributed content display system includes several independent mobile display devices and a host server. The host server is communicatively coupled with the independent mobile display devices and is configured to divide the content into several pixels. The host server is also configured to assign single pixels from the several pixels individually to distinct display devices selected from the several mobile display devices. The host server is also configured to instruct the display devices having assigned pixels to display their assigned single pixels.

In another aspect of the inventive subject matter, a method for display content is presented. The method provides access to a host server that is coupled with several independent mobile display devices. The method configures the host server to divide the content into several pixels. The method also configures the host server to assign single pixels from the several pixels individually to distinct display devices selected from the several mobile display devices. The method configures the host server to instruct the display devices that have assigned single pixels to display their assigned single pixels.

In some embodiments, the several display devices include a group of heterogeneous display devices. In some of these embodiments, the group of heterogeneous display devices includes displays that have different display resolutions. The group of heterogeneous display devices in some embodiments includes displays of different sizes.

In some embodiments, each display device in the distributed content display system includes display device attributes that define the characteristics of the display device. Examples of such attributes include at least the followings: location information, seat assignment information (when the display devices are located in a stadium setting), an orientation, flash availability. For example, the host server of some embodiments is configured to obtain location information associated with each of the several mobile display devices. In some of these embodiments, the host server is configured to assign the single pixels to the distinct display devices based on the display attributes of the distinct display devices.

In addition, the host server of some embodiments is further configured to iteratively assign pixels to each display device over a time period (e.g., distributing a series of images, etc.). In some of these embodiments, the attributes of a display device changes over time (e.g., move to a different location, to a different orientation, etc.). Thus, the host server's assignments of pixels to each display device depend on the changes in display attributes of the display device over the time period.

In some embodiments, the content that is being presented by the distributed content display system includes image data. In addition, the image data in some embodiments includes an image that is derived from video data. In addition, the content in some embodiments include advertising content.

In order to allow a content administrator of the distributed content display system to deploy content to the mobile display devices, the host server of some embodiments includes an administrator interface. In some of these embodiments, the administrator interface includes a touch sensitive display that is configured to receive a touch input from the content administrator for deploying the content. In these embodiments, the host server is configured to map different gestures received on the touch sensitive display to different pixel assignments.

In some embodiments, the host server is communicatively coupled to the mobile display devices over a network (e.g., a local area network, the Internet, a telecommunication network, etc.).

Various objects, features, aspects and advantages of the inventive subject matter will become more apparent from the following detailed description of preferred embodiments, along with the accompanying drawings in which like numerals represent like components.

DETAILED DESCRIPTION

Figure 1:
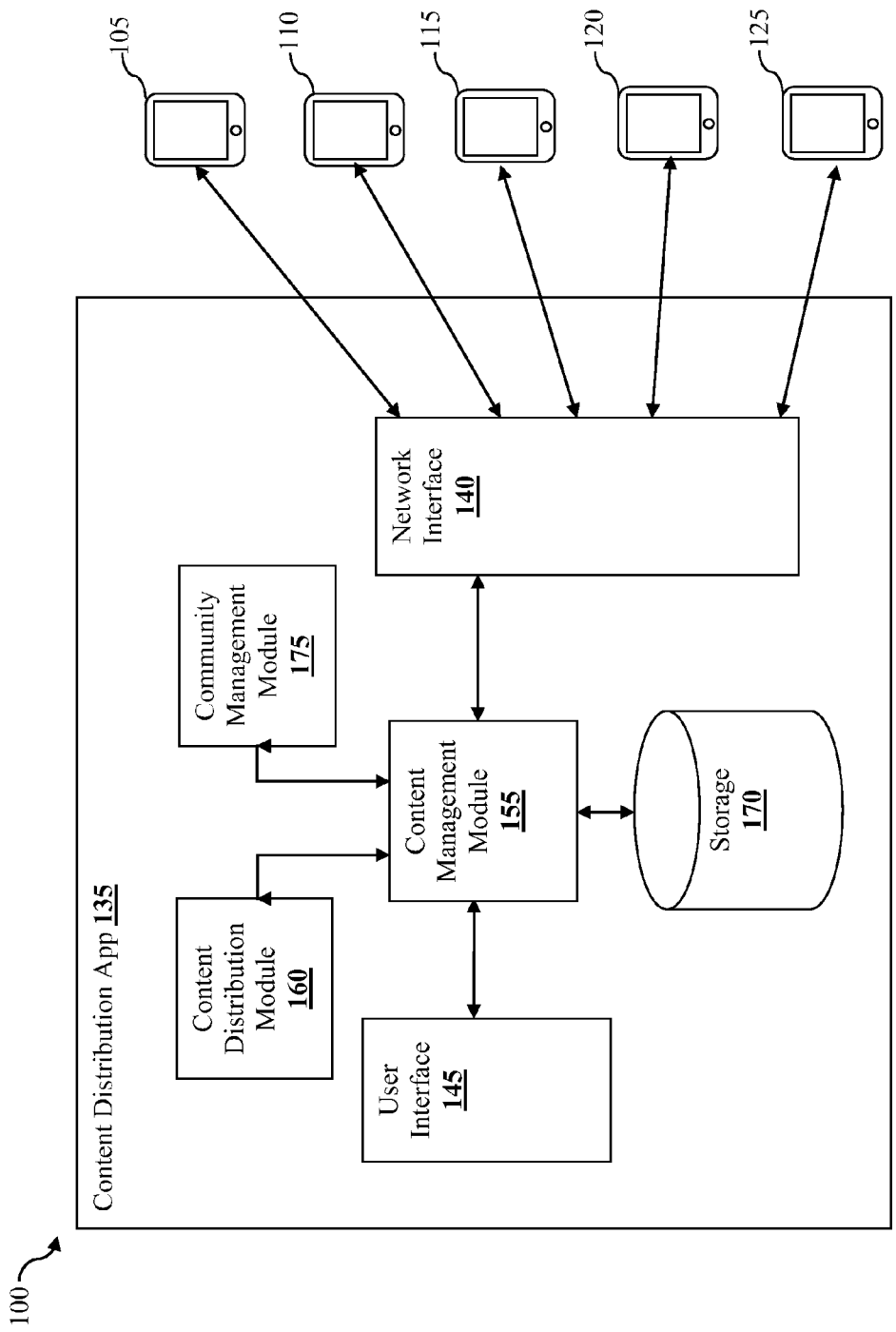
FIG. 1 illustrates a content distribution system of some embodiments.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that while the following description is drawn to a computer/server based content distribution system, various alternative configurations are also deemed suitable and may employ various computing devices including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network where two or more devices are configured to exchange data over the network, possibly via one or more intermediary devices.

According to some aspects of the present invention, a distributed content display system and for distributing content across multiple independent display devices is presented. In some embodiments, the distributed content display system includes several independent mobile display devices and a host server. The host server is communicatively coupled with the independent mobile display devices. The host server is also configured to (i) divide the content into several pixels, (ii) assign single pixels from the several pixels individually to distinct display devices selected from the several mobile display devices, and (iii) instruct the display devices having assigned pixels to display their assigned single pixels.

FIG. 1 illustrates an example of such a content distribution system 100. As shown, the content distribution system 100 of some embodiments includes several independently operated mobile display devices 105-125 and a content distribution application 135. In some embodiments, the content distribution application 135 is executed within a host server that is communicatively coupled with the mobile display devices 105-125.

In some embodiments, the mobile display devices 105-125 are mobile devices that include a display screen, a processor, and a network interface for communicating with other devices (and the host server) over a network (e.g., a local area network, a wide area network, the Internet, etc.). Examples of a mobile display device include various mobile phones (e.g., iPhone™, Android™, etc.), tablet computers (e.g., iPad™, Blackberry® PlayBook™, Samsung® Galaxy Tab™, etc.), and laptop computers.

In some embodiments, the content distribution system 100 is capable of distributing content across a community of heterogeneous mobile display devices that are operated by different users. The community of heterogeneous mobile display devices in some embodiments can include devices from different manufacturers, devices with displays having different display resolutions, and/or devices with displays having different sizes.

As shown in the figure, the content distribution application 135 includes a content management module 155, a community management module 175, a content distribution module 160, a user interface 145 for interacting with a content administrator via one or more input device (e.g., a keyboard, a mouse, a touch-sensitive input device) and one or more output device (e.g., a display screen), a storage 170, and one or more network interfaces 140.

In some embodiments, the community management module 175 of the content distribution application 135 is configured to manage the creation and administration of a mobile display community. A mobile display community can be created in different ways. In some embodiments, the content distribution application 135 can allow a content administrator to create a community through the user interface 145.

Figure 2:
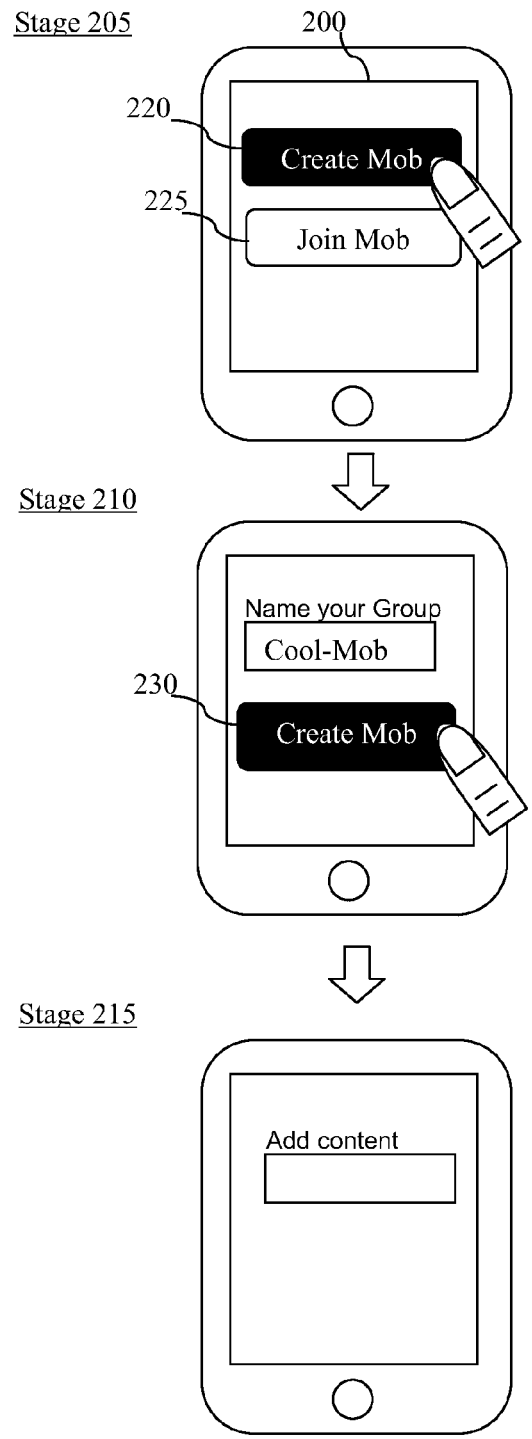
FIG. 2 illustrates an example user interface for creating a content distribution community.

FIG. 2 illustrates an example user interface 200 that the content distribution application 135 provides for the content administrator to create a community at three different stages 205, 210, and 215. The first stage 205 illustrates the user interface 200 after the content administrator initiates the content distribution application 135 on the host server. In some embodiments, the host server is another mobile device which allows the user to either create or join a community. As shown, the user interface 200 includes a "create" selectable item (e.g., a button) 220 and a "join" selectable item (e.g., a button) 225. At this first stage 205, the content administrator begins the community creation process by selecting the "create" selectable item 220, as shown by the darkening of the selectable item 220.

The second stage 210 illustrates the user interface 200 after the content administrator initiated the community creation process by selecting the "create" selectable item 220. As shown, the user interface 200 includes an input box that allows the content administrator to name the Community and a "create community" selectable item 230. In this example, the user administrator names the community as "Cool-Mob", and create the community by selecting the "create community" selectable item 230, as shown by the darkening of the selectable item 230.

The third stage 215 illustrates the user interface 200 after the community "Cool-Mob" is created. As shown in the figure, after creating a community, the user interface 200 of some embodiments allows the content administrator to add content to the host server. In some embodiments, the user interface 200 at this third stage 215 displays a color wheel that includes multiple different colors from which the content administrator can select. In other embodiments, the user interface 200 allows the content administrator to specify a file (e.g., an image file, a video file, etc.) that is stored on the host server or over a network. After receiving location of the content file, the content distribution application 135 retrieves the file (via the network interface 140 or locally on the host server) and stores the file temporarily on the storage 170.

In some embodiments, after a community is created, the community management module 175 of some embodiments would broadcast the community's information (e.g., a community ID, etc.) within a network (e.g., a local network), so that other mobile display devices (e.g., mobile display devices 105-125) within the same network can detect and join this community.

Although not shown in the figure, the community management module 175 can also allows the content administrator to set rights levels for each community so that the administrator can control which display device can join a particular community.

Figure 3:
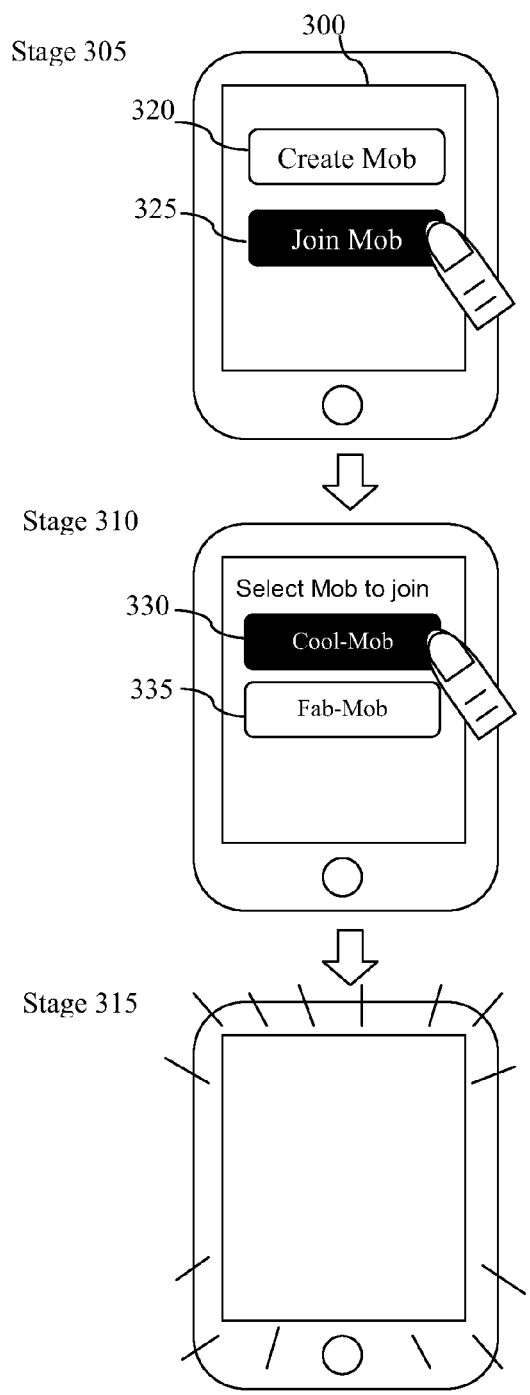
FIG. 3 illustrates an example user interface for joining a content distribution community.

Different embodiments of the invention use different techniques to allow the independent mobile display devices to join a community. FIG. 3 illustrates an example user interface 300 for allowing a user to join a community at three different stages 305, 310, and 315.

The first stage 305 illustrates the user interface 300 after the user initiates a client application on a mobile display device. As shown, the user interface 300 includes a "create mob" selectable item (e.g., a button) 320 and a "join mob" selectable item (e.g., a button) 325. At this first stage 305, the user begins the process to join a community by selecting the "join mob" selectable item 325, as shown by the darkening of the selectable item 325.

The second stage 310 illustrates the user interface 300 after the user initiated the process to join a community by selecting the "join mob" selectable item 325. As shown, the user interface 300 presents a list of communities that have been created by different content administrators. In some embodiments, the mobile display device detects any community ID being broadcasted by a host server, and lists all detected communities that the mobile display device has access to join through the interface 300. In this example, the mobile display device has detected two different communities: "Cool-Mob" community 330 and "Fab-Mob" community 335. The user can select one of the displayed selectable items to join a community. The second stage 310 also shows that the user has selected to join the "Cool-Mob" community, as indicated by the darkening of the selectable item 330 representing the "Cool-Mob" community. Once the user has joined the "Cool-Mob" community, a communication session will be established between the mobile display device of the user and the content distribution application 135. This communication session can be used throughout the existence of the community for managing the mobile display device, communication of information of the mobile display device to the content distribution application 135, and communication of content from the content distribution application 135 to the mobile display device.

After joining a community, the mobile device sends attributes of the mobile device to the host server. In some embodiments, the attributes of the mobile device includes at least the following: the physical location of the mobile device, the seat assignment of the mobile device (if the mobile device is located in a stadium with numbered seating), the orientation of the mobile device, display size and display resolution of the mobile device, flash capability of the mobile device, and others.

As mentioned above, the content distribution application 135 allows the content administrator to manage the devices through the user interface. For example, the content administrator can modify the rights level of the community (e.g., allowing a set of mobile display devices to join the community and/or excluding a set of mobile display devices from joining the community) and/or remove certain devices from the community.

In addition to creating and managing a mobile display device community, the content distribution application 135 of some embodiments also provides an interface to allow the content administrator to configure a manner in which the content is distributed and displayed on the community of mobile display devices.

Figure 4:
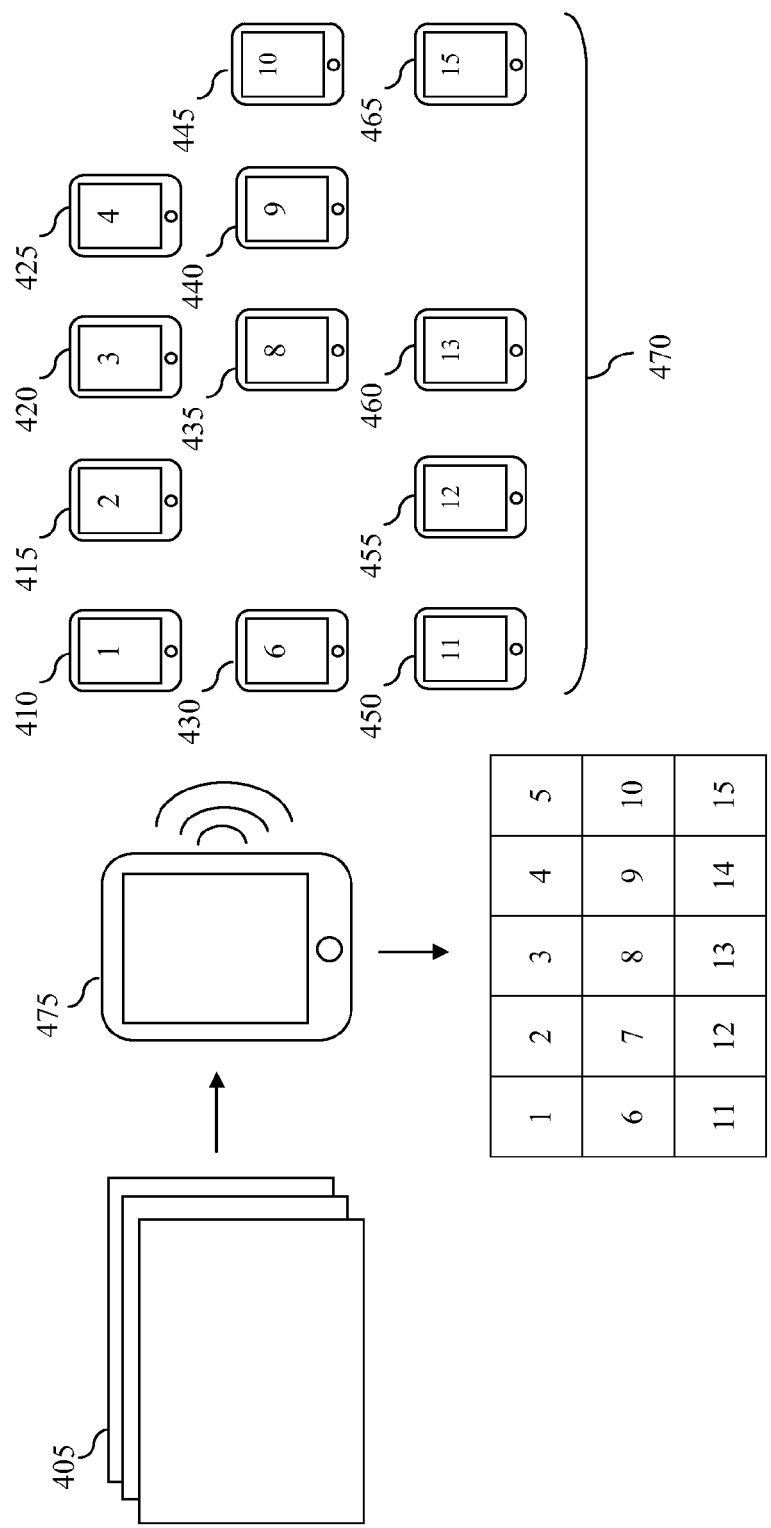
FIG. 4 illustrates the mechanism of dividing and assigning content to different mobile display devices.

In some embodiments, the content distribution application 135 allows the content administrator to configure the display of the content across the mobile display devices in the community in many different ways. In one approach, the content distribution application 135 can divide the content (e.g., an image) into multiple different pixel groups and instruct each mobile display device in the community to display a different pixel group of the image. FIG. 4 illustrates an example of configuring devices to display a set of images under this approach. In this figure, a host server 475 has created a community 470 comprising mobile display devices 410-465. In this example, the content distribution application 135 is configured by a content administrator to instruct the community 470 to present a set of images 405. In some embodiments, the set of images 405 are part of a sequence of images in a video clip.

Once content (e.g., the set of images 405) is provided, the content management module 155 sends the content to the content distribution module 160 for processing. In some embodiments, the content distribution module 160 first divides the first image in the set of images 405 into multiple pixel groups. As shown in FIG. 4, the content distribution module 160 has divided the first image into fifteen different pixel groups. Each pixel group includes one or more image pixels from a distinct portion of the image. A pixel of an image is defined herein as the smallest element in the image that can be characterized by a location within the image, a color, and an intensity level. In this example, the content distribution module 160 has divided the first image into fifteen different pixel groups, forming three rows with five pixel groups in each row. Each pixel group represents a portion of the original image. Furthermore, each pixel group is assigned with an identifier 1 through 15.

After dividing the image, the content distribution module 160 then assigns each pixel group of the image to a different mobile display device in the community 470. In some embodiments, the content distribution module 160 assigns the pixel groups based on the physical locations. FIG. 4 also illustrates how the mobile display devices 410-465 are physically located with respect to each other. As shown, the mobile display devices generally form three rows with approximately four mobile display devices in each row. The purpose of assigning different pixel groups to different mobile display devices based on their physical location is to have the community of mobile display devices (e.g., community 470) collectively acting as one "big screen" and presents the entire image on this "big screen". In other words, each mobile display device in the community presents only a pixel (or several pixels) of the image, and the display devices collectively present the entire image. As such, the content distribution module 160 is configured to detect the physical location of the different display devices 410-465 and assign a pixel group of the image to each display device based on the physical location of that display device with respect to the other display devices within the community, so that the community as a whole can present the entire image coherently.

In this example, based on the relative physical locations of the mobile display devices, the content distribution module 160 assigns pixel group '1' to mobile display device 410, pixel group '2' to mobile display device 415, pixel group '3' to mobile display device 420, pixel group '4' to mobile display device 425, pixel group '6' to mobile display device 430, pixel group '8' to mobile display device 435, pixel group '9' to mobile display device 440, pixel group '10' to mobile display device 445, pixel group '11' to mobile display device 450, pixel group '12' to mobile display device 455, pixel group '13' to mobile display device 460, and pixel group '15' to mobile display device 465.

Since the mobile display devices are dispersed generally (and sometimes randomly) in a location (e.g., a stadium, a concert hall, etc.), there will be areas within the general location without a mobile display device (i.e., holes in the "big screen"). In some embodiments, instead of assigning the pixel groups corresponding to the holes to mobile display devices that are "out of place" with respect to the big screen, the content distribution module 160 is configured to not assign the pixel groups corresponding to the holes to any mobile display devices. As shown in this example, pixel groups '5', '7', and '14' are not assigned to any mobile display devices.

After the mobile display devices in the community have been assigned with the pixel groups, the content management module 155 then sends data of each assigned pixel group to its corresponding mobile display device via the network interface 140 for display.

As mentioned above, the content distribution module 160 of some embodiments determines the physical location of the display devices in order to assign pixel groups of the image to the devices. The content distribution module 160 can determine the physical location of the display devices in many different ways. In some embodiments, the content distribution module 160 is configured to instruct the mobile display devices in the community to send their location information to the content host server 475. In these embodiments, the mobile display devices cooperate with a location tracking system (e.g., Global Positioning System, a small-scaled location tracking system within a stadium, etc.) to determine the location of the devices, and then send their location information to the host server 475.

The content that is being presented in the "big screen" of the community can be an advertisement, an image that is part of a video clip (e.g., a live video feed associated with the event for which the community is created), a logo, a message, etc. When the content contains video data comprising a sequence of images, the content distribution module 160 is configured to perform the same process to each image and sends the pixel groups to the different mobile display devices for display.

Although only twelve mobile display devices are shown in this example, a content community can potentially support as few as two mobile display devices and as many as hundreds or even thousands of mobile display devices (as in the case of a stadium setting) to create the "big screen".

The physical location of the mobile display devices can change over time during the community session. For example, the user of the mobile display devices can move from one location to another throughout a live concert, and sport game, etc. Thus, it is contemplated that the content distribution application 135 will continuously track the physical locations of the different mobile display devices within the community throughout the session and assign the different pixel groups of the images to the devices according to the most updated physical locations of the devices.

In addition to controlling the content that is presented in the mobile display devices, the content distribution module 160 of some embodiments also allows the content administrator to control the temporal element of the presentation. For example, the content distribution module 160 can send temporal data along with the content to the mobile display devices to instruct the mobile display devices to present the content at a specific time.

Figure 5:
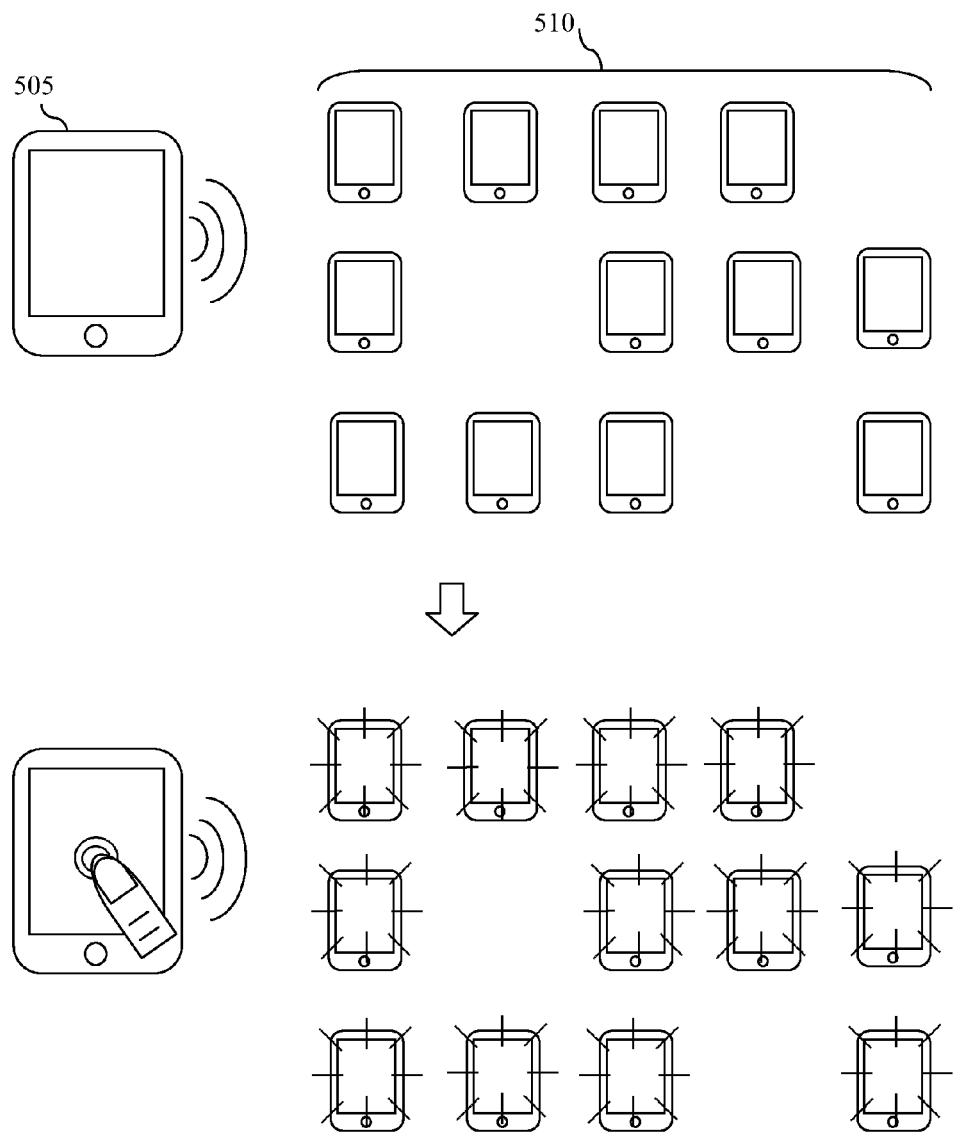
FIG. 5 illustrates an example user interface for controlling the distribution and presentation of the content.

Different approach implements different techniques in allowing the content administrator to control the timing of the presentation. FIG. 5 illustrates an example interface that the content distribution application 135 provides to the content administrator to control the timing of the content presentation through a touch-sensitive display associated with the host server. In this example, after the content administrator has provided the content distribution application 135 with content (e.g., an image), the content distribution application 135 allows the content administrator to control the timing of the presentation by instructing the mobile display devices to present the image only when the user administrator provides a signal to the touch sensitive display.

As shown in FIG. 5, a host server 505 has formed a community 510 and has established a communication session with the mobile display devices of the community 510. In some embodiments, the host server 505 can send the content information to the mobile display devices in the community 510 at this time. However, the host server 505 also instructs the mobile display devices to not present the content until receiving a signal (e.g., a gesture such as a tab on the touch-sensitive display of the host server 505). When the content distribution application 135 that is running in the host server 505 receives the gesture input from the user administrator provides (e.g., a tab on the touch-sensitive display of the host server 505), the content distribution module 160 sends a signal to the mobile display devices in the community 510 to instruct them to display the content.

Figure 6:
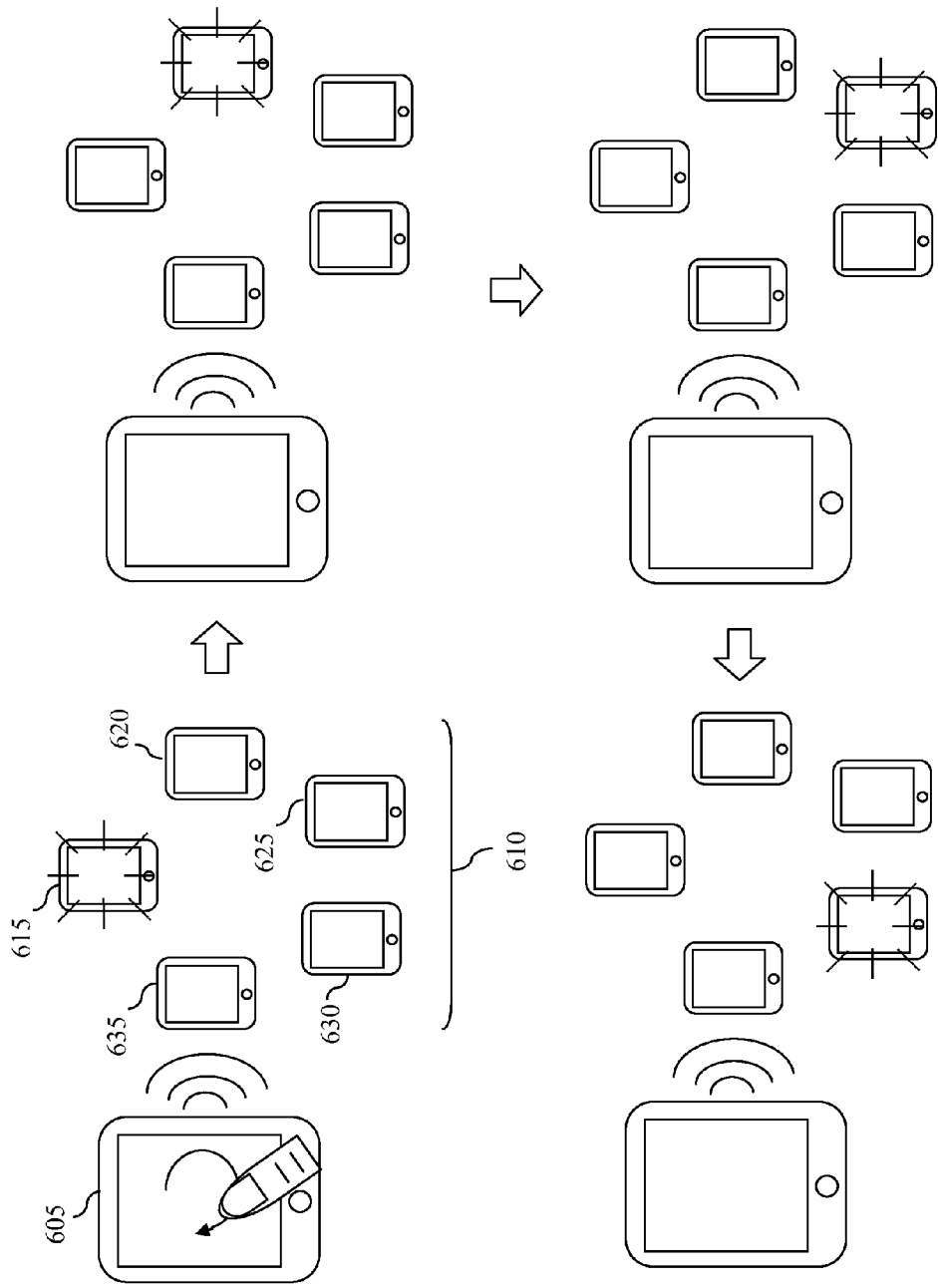
FIG. 6 illustrates another example user interface for controlling the distribution and presentation of the content.
Figure 7:
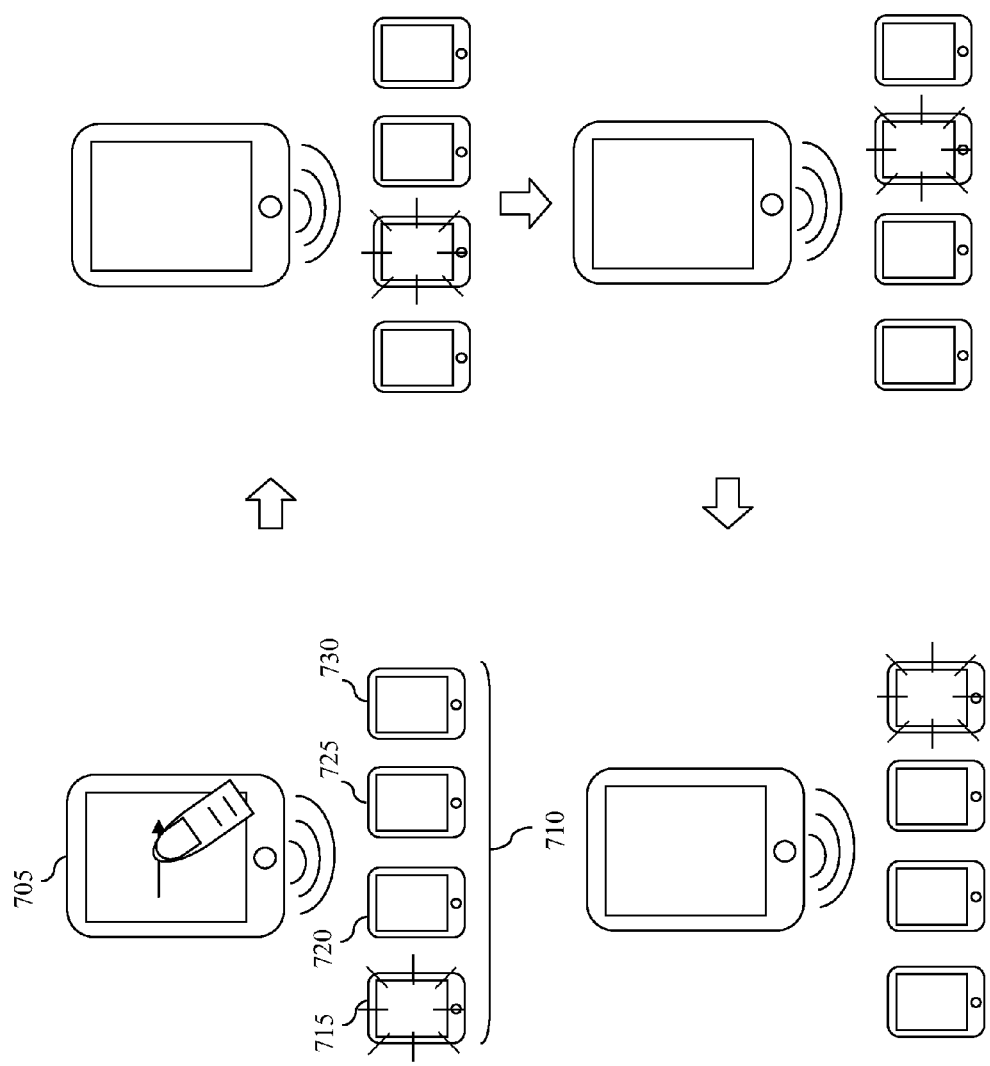
FIG. 7 illustrates another example user interface for controlling the distribution and presentation of the content.

Instead of directing the mobile display devices to present content at the same time, the content distribution application 135 of some embodiments provides an interface that allows the content administrator to create different temporal presentation patterns. FIGS. 6 and 7 illustrate two examples of allowing the user administrator to create different temporal presentation patterns.

In FIG. 6, a host server 605 running a content distribution application 135 has created a community 610 comprising mobile display devices 615-635. The mobile display devices 615-635 are located with respect to each other in a way that the mobile display devices 615-635 form a circle. As shown, the content administrator provides a gesture input to the host server 605 (e.g., a circular swiping motion on the touch-sensitive display of the host server 605). In response to this gesture input, the content distribution module 160 begins to send a series of signals to the mobile display devices 615-635 to present the content. In this example, the content distribution module 160 sends the signals to the mobile display devices 615-635 sequentially (i.e., one after another) according to their physical location so that the mobile display devices presents the content one at a time around the circle. As such, the content distribution module 160 sends a first signal to mobile display device 615, waits (e.g., wait for a second, half a second, etc.), and then sends a second signal to mobile display device 620, waits, and then sends a third signal to mobile display device 625, and so forth until all mobile devices have presented the content. The content can be a white light, a color pixel, or any type of image.

FIG. 7 illustrates an alternative temporal presentation pattern. In this figure, a host server 705 running the content distribution application 135 has created a community 710 comprising mobile display devices 715-730. In this example, the mobile display devices 715-730 are located with respect to each other in a way that the mobile display devices 715-730 form a horizontal line. As shown, the content administrator provides a gesture input to the host server 705 (e.g., a horizontal swiping motion on the touch-sensitive display of the host server 705). In response to this gesture input, the content distribution module 160 begins to send a series of signals to the mobile display devices 615-635 to present the content. In this example, the content distribution module 160 sends the signals to the mobile display devices 615-635 sequentially (i.e., one after another) according to their physical location so that the mobile display devices presents the content one at a time from the left-most mobile device 715 to the right-most device 730. As such, the content distribution module 160 sends a first signal to mobile display device 715, waits (e.g., wait for a second, half a second, etc.), and then sends a second signal to mobile display device 720, waits, and then sends a third signal to mobile display device 725, and so forth until all mobile devices have presented the content. The content can be a white light, a color pixel, or any type of image.

In addition to the interface illustrated in FIGS. 5, 6, and 7, it is contemplated that different interfaces can be used for controlling the timing and/or content of the presentation. In some embodiments, the host server can be associated with a microphone, and the content distribution system can associate different audio inputs with different temporal display instructions. The audio inputs can be distinguished by volume of the sound, tone of the sound, or human voice commands (e.g., "send", "left to right", "circle", etc.). As such, the host administrator can provide display instructions by calling out the commands. In some embodiments, the host server can be associated with a device with a gyroscope (for measuring orientation of the device). In these embodiments, the content distribution system can associate different motion on the device (e.g., shaking the device, tilting the device, moving the device rapidly from one location to another location, etc.) with different temporal display instructions.

In yet some other embodiments, the host server can also be associated with one or more motion sensors (either attached to a person or in proximity to the person who is controlling the presentation). In these embodiments, the content distribution system can detect motions of a person (e.g., a performer) and associate different motions (e.g., hand gestures, body gestures, raising a hand, swinging an arm, punching, different dance moves, etc.) with different temporal display instructions.

In some embodiments, the content distribution system 100 can allow the content administrator to provide interactive content (instead of static content). Under one approach, the interactive content can be interactive with the mobile display devices within the community. In some of these embodiments, the content distribution system 100 of some embodiments can configure and/or modify the interactive content being presented based on attributes of one or more of the mobile display devices (e.g., gyroscope sensor data, touch-sensitive display data, etc.) within the community. For example, when the audiences are creating "waves" in an event, the content distribution system 100 can instruct the mobile display devices to change the content displayed on the mobile display devices (e.g., display a different color, display pixel groups from a different image, etc.) when the mobile display devices detect an abrupt upward movement (from users raising their hands) from their gyroscope sensors. In another example, the content distribution system 100 can instruct the mobile display devices of a community to display a video of a moving object (e.g., a ball). When the object is near a particular mobile display device, the content distribution system 100 can detect motions of the particular mobile display device (e.g., a flick, rapid movement, etc.) using the device's sensor, and modify the content (e.g., the video) according to the movement (e.g., when user flick the device to the right, display the object moving in that same direction on the "big screen").

Under a different approach, the content distribution system 100 can also allow the interactive content to interact with a physical object (e.g., a big inflated balloon with a sensor among the audiences). The physical object can be moved around the mobile devices, and when a subset of mobile devices detect the proximity of the physical object, it is instructed by the content distribution system 100 to display content from a different image (e.g., the subset of the mobile devices will each display a portion of a video of a fireball/explosion, etc.).

Under yet another approach, the content distribution system 100 can also allow the interactive content being presented in one community to interact with other interactive content being presented in a different community. In these embodiments, the content distribution system 100 includes one or more host servers associated with several communities. In one example, when mobile devices between two different community overlap geographically, the content distribution system 100 will instruct the overlapped mobile display devices to display different content (e.g., content that is completely distinct from the content being presented in each community, mixed content that is combined from content of the two communities, etc.).

In some embodiments, distribution of synchronized content from a host server to the mobile display devices can require large bandwidth that might not be available in some local network. Therefore, a distributed scheme for distributing the content to the mobile display devices is contemplated to reduce the bandwidth load of the network. In some of these embodiments, a few "super-devices" are selected from the mobile display devices from the community. The super-devices can be selected based on their physical location or other attributes of the devices, and each super-device is associated with a distinct group of mobile display devices (based on their physical proximity to the super-device, for example). The content distribution system 100 then distributes pixel groups in batches to the super-devices, and the super-devices are instructed to distribute the individual pixel group to different mobile display devices according to the instructions.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A distributed content display system capable of presenting content comprising:
    a set of independent mobile display devices; and
    a host server communicatively coupled with the plurality of mobile display devices and configured to:
        provide an administrator interface configured to enable an administrator to create a community;
        provide a community interface communicatively coupled with the set of independent mobile display devices and configured to enable any one of the set of independent mobile display devices to register as part of the community;
        receive registration requests from only a subset independent mobile display device;
        divide the content into a plurality of pixels;
        retrieve geographical location attributes comprising at least a latitude attribute, a longitude attribute, and an elevation attribute from the subset of independent mobile display devices;
        assign distinct single pixels from of the plurality of pixels individually to distinct display devices selected from the subset of mobile display devices based on the retrieved geographical location attributes of the subset of mobile display devices; and
        instruct the subset of display devices having assigned single pixels to display their assigned single pixels.

2. The distributed content display system of claim 1, wherein the set of display devices comprises a group of heterogeneous display devices.

3. The distributed content display system of claim 2, wherein the group of heterogeneous display devices comprises displays having different display resolutions.

4. The distributed content display system of claim 3, wherein the group of heterogeneous display devices comprises displays of different sizes.

5. The distributed content display system of claim 1, wherein the content comprises image data.

6. The distributed content display system of claim 5, wherein the image data comprises an image derived from video data.

7. The distributed content display system of claim 1, wherein the content comprises advertising content.

8. The distributed content display system of claim 1, wherein each display device comprises display device attributes.

9. The distributed content display system of claim 8, wherein the display attributes comprises at least one of: seat assignment information, an orientation, or flash availability.

10. The distributed content display system of claim 8, wherein the host server is further configured to assign the single pixels to the distinct display devices based on the display attributes of the distinct display devices.

11. The distributed content display system of claim 8, wherein the host server is further configured to iteratively assign pixels to each display device over a time period, wherein the assigning of pixels to each display device depends on changes in display attributes of the display device over the time period.

12. The distributed content display system of claim 1, wherein the host server is further configured to obtain display device attributes associated with each of the set of mobile display devices.

13. The distributed content display system of claim 1, wherein the host server is communicatively coupled to the set of display devices over a network.

14. The distributed content display system of claim 1, wherein the administrator interface is further configured to allow the administrator to deploy the content.

15. The distributed content display system of claim 14, wherein the administrator interface comprises a touch sensitive display that is configured to receive a touch input from the content administrator for deploying the content.

16. The distributed content display system of claim 15, wherein the host server is further configured to map different gestures received on the touch sensitive display to different pixel assignments.

17. A method for displaying content comprising:
- providing access to a host server that is coupled with a set of independent mobile display devices;
- dividing, by the host server, the content into a plurality of pixels;
- providing, by the host server, an administrator interface configured to enable an administrator to create a community;
- providing, by the host server, a community interface communicatively coupled with the set of independent mobile display device and configured to enable any one of the set of independent mobile display device to register as part of the community;
- receiving, at the host server, registration requests from only a subset of independent mobile display devices;
- retrieving by the host server, geographical location attributes comprising at least a latitude attribute, a longitude attribute, and an elevation attribute from the subset of independent mobile display devices;
- assigning, by the host server, distinct single pixels from of the plurality of pixels individually to distinct display devices selected from the subset of mobile display devices based on the retrieved geographical location attributes of the subset of mobile display devices; and
- instructing, by the host server, the subset of display devices having assigned single pixels to display their assigned single pixels.

18. The method of claim 17, wherein the subset of mobile display devices comprises display devices having different display resolutions.

19. The method of claim 17, wherein each display device comprises display device attributes, wherein the method further comprises configuring the host server to assign the single pixels to the distinct display devices based on the display attributes of the distinct display devices.

20. The method of claim 19, further comprising iteratively assigning pixels to each display device over a time period based on changes in display attributes of the display device over the time period.

* * * * *